United States Patent [19]
Choi

[11] Patent Number: 5,132,805
[45] Date of Patent: Jul. 21, 1992

[54] IRIS DRIVING CIRCUIT

[75] Inventor: Hae-yong Choi, Suwon, Rep. of Korea

[73] Assignee: SamSung Electronics Co., Ltd., Suwon, Rep. of Korea

[21] Appl. No.: 491,520

[22] Filed: Mar. 12, 1990

[30] Foreign Application Priority Data

Sep. 12, 1989 [KR] Rep. of Korea .................. 89-13541

[51] Int. Cl.$^5$ .................. H04N 5/238; H04N 9/64
[52] U.S. Cl. ...................... 358/228; 358/29; 328/132; 307/154
[58] Field of Search ............. 358/228, 29 C, 213.19, 358/209; 909, 225, 41, 55; 354/271.1, 441, 446, 435; 328/132, 72; 307/151, 154

[56]  References Cited

U.S. PATENT DOCUMENTS

| | | | |
|---|---|---|---|
| 3,571,495 | 3/1971 | Konings | 358/228 |
| 4,638,350 | 1/1987 | Kato et al. | 358/29 C |
| 4,727,413 | 2/1988 | Miura et al. | 358/29 C |
| 4,737,855 | 4/1988 | Arai et al. | 358/228 |
| 4,959,727 | 9/1990 | Imaide et al. | 358/228 |

FOREIGN PATENT DOCUMENTS 0097284 6/1982 Japan .................. 358/29 C
0123287 7/1983 Japan .................. 358/29 C Primary Examiner—James J. Groody
Assistant Examiner—Safet Metjahic
Attorney, Agent, or Firm—Robert E. Bushnell

[57] ABSTRACT

An iris driving circuit, adapted to a color video camera, detects excessive intensity of radiation above a predetermined level from a white-colored subject so that an iris is controlled to optimize the function of auto white balance. The iris driving circuit has a power supply control circuit for supplying to the respective portion of the system only for the predetermined limit time, a level signal detection circuit for detecting the signal of the excessive intensity of radiation by extracting and amplifying only the luminance signal above the predetermined level, a filter & amplifier circuit for filtering and amplifying the excessive intensity of radiation detected from the level signal detection circuit a white balance set signal generating circuit for generating an auto white balance set signal in accordance with the condition of the excessive intensity of radiation signal filtered from the filter & amplifier circuit, and an iris adjust signal generating circuit for generating an iris adjusting signal after receiving the filtered signal of the excessive intensity of radiation outputted from the filter and amplifier circuit.

9 Claims, 3 Drawing Sheets

IRIS DRIVING CIRCUIT

FIELD OF THE INVENTION

The present invention relates to an iris driving circuit, and more particulary to the iris driving circuit which is capable of optimizing normally the function of the auto white balance in the color video camera.

BACKGROUND OF THE INVENTION

Generally, an auto white balance circuit adapted to the color video camera is used for representing the color to be closer to the color of the subject which is located at the photograph place when the color temperatures are different from each other.

Then, an auto white balance circuit is set to perform the function of the auto white balance after the image sensing of the white color subject, but a prior auto white balance circuit is operated even if the white color subject emits the excessive intensity of radiation above 100 IRE, with the result that it is impossible to perform the function of the auto white balance, and also, when the function of the auto white balance is not performed, only a warning expression of "NG" is displayed.

Therefore, there is a very inconvenient problem that when the reflective light of the excessive intensity of radiation from the white colored subject is incident to the iris, the iris is driven from an automatic condition to a manual condition so as to diminish the intensity of radiation incident thereto. After the iris is set at the place where the Zebra signal disappears, representing the part of the excessive intensity of radiation of the white colored subject on the electronic viewfinder, the auto white balance selection switch should be operated again.

SUMMARY OF THE INVENTION

It is an object of the present invention to provide an iris driving circuit which is capable of optimizing normally the function of the auto white balance in the color video camera when the excessive intensity of radiation above the predetermined level of the white colored subject is incident to the iris, by installing the iris driving circuit between an auto white balance circuit selection switch SW and an auto white control circuit C as shown in FIG. 1, so that the function of the auto white balance is performed above the predetermined level.

So as to achieve the object as described above, in an iris driving circuit comprising an auto white balance circuit selection switch, an iris control signal generating device and an auto white balance control device, the present invention is characterized by further comprising: a power supply control device for supplying to the respective portion of the system only for the predetermined limit time: a level device for detecting the signal of the excessive intensity of radiation by extracting and amplifying the only luminance signal above the predetermined level; a filter and amplifier device for filtering and amplifying the excessive intensity of radiation detected from the level signal detection device; a white balance set signal generating device for generating an auto white balance set signal in accordance with the condition of the excessive intensity of radiation signal filtered from the filter and amplifier device; an iris adjusting signal generating device for generating an iris adjusting signal after receiving the filtered signal of the excessive intensity of radiation outputted from the filter and amplifier device.

BRIEF DESCRIPTION OF THE DRAWINGS

The above objects and advantages of the present invention will become more apparent by describing the preferred embodiments of the present invention with reference to the attached drawings in which.

DESCRIPTION OF THE PREFERRED EMBODIMENT

Figure 1:
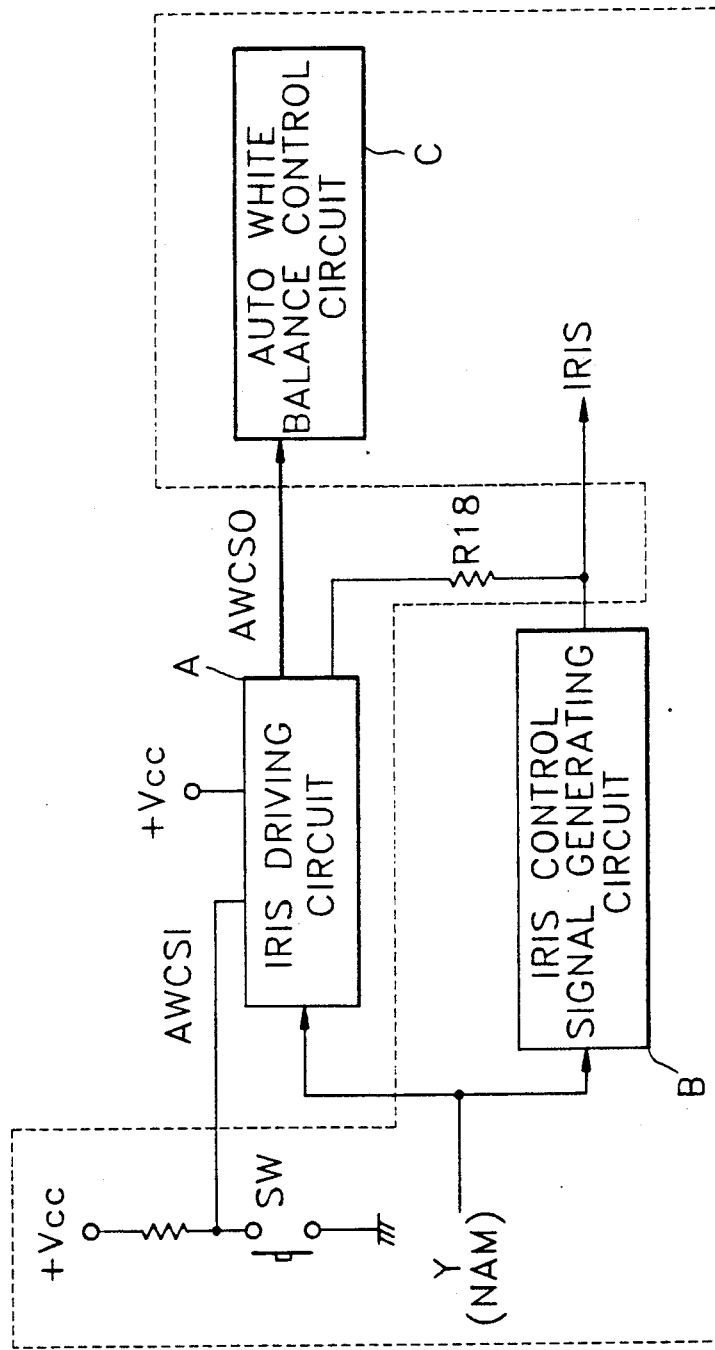
FIG. 1 is a partial schematic diagram showing the optimization of the function of the auto white balance in the color video camera to which an iris driving circuit according to the present invention is adopted.

In FIG. 1, an iris driving circuit A is provided to transmit an auto white balance set signal AWCSO to an auto white balance control circuit C by inputting a luminance signal Y or NAM signal in accordance with the condition of an auto white balance selection switch SW. Another output of the iris driving circuit A is mixed with an output of the conventional iris control signal generating circuit B and controls the iris not shown in FIG. 1.

Figure 2:
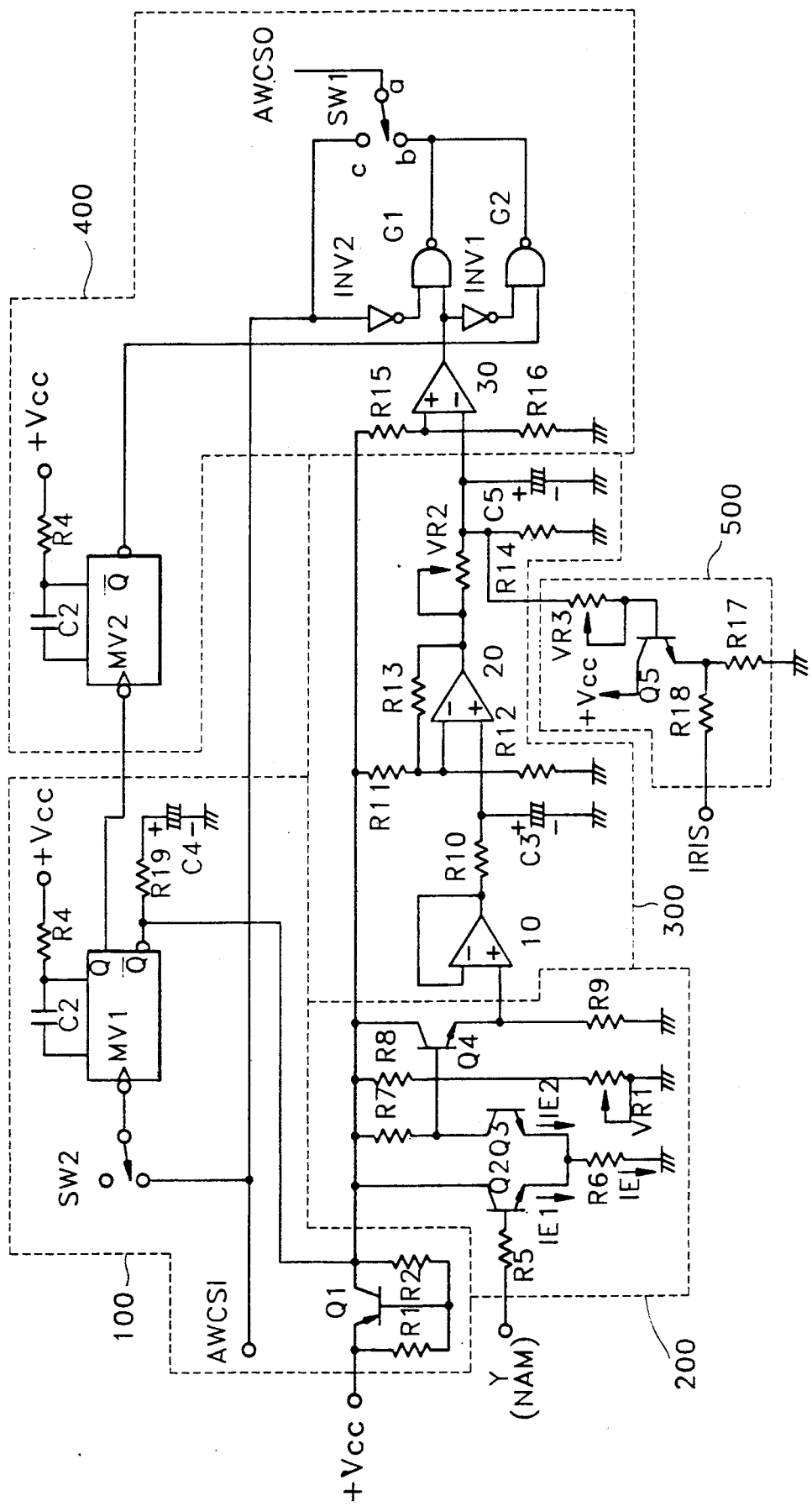
FIG. 2 is an illustration of an embodiment of an iris driving circuit according to the present invention.

FIG. 2 shows an iris driving circuit A as shown in FIG. 1 according to the present invention.

In FIG. 2, a power supply control device 100 is composed of a second selection switch SW2 for selecting whether an automatic control of an auto white balance signal input AWCSI by receiving the signal from the auto white balance selection switch SW is performed or not; a mono-stable multivibrator MV1 for deciding a power supply time so as to set the non-stable time with a time constant by a resistor R3 and a capacitor C1 connected to one terminal of the second selection switch SW2, a PNP transistor Q1 for a power supply change-over switch having resistors R1, R2; a resistor R19 and a capacitor C4 for delaying the off-time which are connected in series between the output terminal $\bar{Q}$ of the mono-stable multivibrator MV1 and the ground; and a level signal detection device 200 is composed of a NPN transistor Q2, Q3 and Q4 for the arrangement of the differential amplifier circuit; a resistor R5 for limiting the base current of the transistor Q2; a resistor R7 for the load of the collector of the transistor Q3; a resistor R8 for biasing off the base of the transistor Q3; an emitter resistor R6 of the transistors Q2 and Q3; a load resistor R9 of the emitter of the transistor Q4 and a variable resistor VR1 for setting the reference of the excessive intensity of radiation, so that the only signal above the predetermined level among the luminance signal Y to be inputted may be extracted and amplified. And a filter and amplifier device 300 is made up of an operational amplifier 10 for the voltage follower; a non-inverting operational amplifier 20 for amplifying the filtered signal; a feedback resistor R13 of the operational amplifier 20; a resistor R10 and a capacitor C3 for filtering the excessive intensity of radiation connected to the output terminal of the operational amplifier 10; a variable resistor VR2 for setting the output level of the filtered signal; a voltage bleeder resistor R14 connected to the one terminal of the variable resistor VR2 and a capacitor C5 for delaying the output.

And a white balance set signal generating device 400 is made up of a mono-stable multivibrator MV2 for generating an auto white balance set signal which the time constant is determined by a resistor R4 and a capacitor C2 being connected to the non-inverting output terminal Q of the mono-stable multivibrator MV1 of the power supply control device 100; a comparator 30 for comparing the signal of the excessive intensity of radiation detected from the filter and amplifier device 300 by setting the reference level by device of the resistors R15 and R16; a NAND gate G1 for combinating logically the inverting auto white balance set input signal $\overline{AWCSI}$ through the inverter INV2 and the output signal of the comparator 30; a NAND gate G2 for combining logically the inverting output signal of the comparator 30 through the inverter INV1 and the output signal of the mono-stable multivibrator MV2; a first selection switch SW1 for outputting selectively the signals which one terminal is connected to the output terminals of the NAND gates G1 and G2 and the other terminal is connected to the auto white balance set input terminal AWCSI.

And an iris adjust signal generating device 500 is made up of an emitter follower NPN transistor Q5 for outputting the iris control signal which one terminal is connected to the filter and amplifier device 300 having a variable resistor VR3 for setting the iris control signal and an emitter resistor R17, and a resistor R18 for limiting the current of the output signal so that the iris adjust signal may be generated.

Detailed description of the iris driving circuit according to the present invention based on the configuration as described above will follow.

Figure 3:
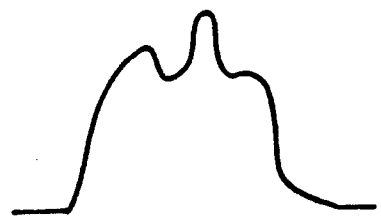
FIG. 3 and FIG. 4 are diagrams showing wave forms of input and output of the respective structural elements of an iris driving circuit according to the present invention.
Figure 3:
Figure 3:
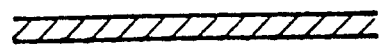

A luminance signal Y or a NAM signal having only the respective maximum values of the color signals R, G and B which are used for the automatic control of an iris in the video camera is applied to the base of the transistor Q2 through a resistor R5 in the level signal detection device 200 with a waveform 3a in FIG. 3. The transistor Q2 remains in the cut-off state except that the signal applied to the base of the transistor Q2 is larger than the voltage of the transistor Q2 by the base-emitter voltage, that is, VBE of about 0.7 Volts.

The emitter potential of the transistor Q3 has the same potential since the emitter of the transistor Q2 is connected to the emitter of the transistor Q3.

The emitter potential of the transistor Q3 may be varied by varying the variable resistor VR1 and the base potential of the transistor Q3. That is, the signal above the voltage which is set by the variable resistor VR1 among the luminance signals Y is applied to the base of the transistor Q2, with the result that an emitter current IE adding the emitter current IE1 of the transistor Q2 and the emitter current IE2 of the transistor Q3 goes through an emitter resistor R6. Since the emitter current IE is constant K according to an equation of (1), a collector current of the transistor Q3 is decreased and a voltage down of the load resistor R7 is decreased so that the base current of the transistor Q4 is increased and the emitter current IE of the transistor Q4 is varied, with the result that the voltage down in the emitter resistor R9 is increased.

$$IE = IE1 + IE2 = K \qquad (1)$$

Therefore, the signal above the predetermined level set by the variable resistor VR1 is extracted and outputted through the emitter of the transistor Q4. The signal outputted through the emitter of the transistor Q4 is integrated in a resistor R10 and a capacitor C3 so as to make a filtered signal through the voltage follower 10 in the filter and amplifier device 300, resulting in a waveform 3b in FIG. 3.

The filtered signal in the resistor R10 and the capacitor C3 is applied to the non-inverting terminal(+) of the non-inverting amplifier 20 having a feedback resistor R13, and in the inverting terminal (−) of the non-inverting amplifier 20, the bias voltage is applied through the resistors R11 and R12 and amplified by the predetermined value so that the voltages are divided by the variable resistor VR2 and a resistor R14.

The voltage which is divided by the variable resistor VR2 and the resistor R14 is supplied to the base of the transistor Q5 through the variable resistor VR3 in the iris adjust signal generating device 500 with a waveform 3C in FIG. 3.

The variable resistor VR3 is for varying the output of the iris control signal by setting variably the base current of the transistor Q5.

The variable resistor VR3 is set to control the iris, so that the excessive intensity of radiation reaches the predetermined level. And, the iris adjust signal outputted from the emitter of the transistor Q5 through a resistor R18 is mixed with the output of the iris control signal generating circuit not shown in the drawing.

It is necessary to consider the relation of the combination with the existing circuit in its actual application since the iris is operated to be closed when the output of the iris control signal becomes larger in the present invention. If the iris is opened when the iris control signal becomes larger in the camera circuit, it is enough that the transistor Q5 is emitter-grounded, but the output of the iris control signal according to the present invention is adapted normally to most of the iris control circuit in the camera.

A part of the filtered signal divided by the variable resistor VR2 and the resistor R14 in the level signal detection device 200 is inputted to the inverting terminal(−) of a comparator 30 in the set signal generating device 400, and a filtered signal input and a reference level set by the resistors R15 and R16 are compared to each other in the comparator 30. When the filtered signal input to the inverting terminal(−) of the comparator 30 becomes larger than the bias value input to the non-inverting terminal(+) of the comparator 30, that is, the signal of the excessive intensity of radiation becomes larger than that, the output of the comparator 30 becomes a low state 4d in FIG. 4, and the output of the NAND gate G1, the output signal AWCSO to be performed.

There is an assumption that the auto white balance is operated in falling from a high state to a low state in the case of the general camera.

However, since the output of the comparator 30 holds the high state when the excessive intensity of radiation is equal to or less than the set level, the output of the comparator 30 becomes the high state inverted at the inverter INV2 when the auto white balance set signal AWCSI becomes the low state. The output of the inverter INV2 having the high state is applied to one input terminal of the NAND gate G1, and the NAND gate G1 generates the output of the low state in accordance with the characteristic of the output of the NAND gate G1 according to the input state, so that the auto white balance signal AWCSO is generated through a selection switch SW1.

The selection switch SW1 and SW2 are the change over switches for deciding among which is adapted the prior system or the present invention. That is to say, when the terminal of the first selection switch SW1 is changed from the connection of (a) to (b) into the connection of (a) to (c), the auto white balance set input signal AWCSI is connected directly to the output terminal AWCSO and the trigger input of the mono-stable multivibrator MV1 is cut off so that the power supply is cut off, with the result that it is not operated. The transistor Q1 for change-over of the power supply in the power supply control device 100 is set to be biased by the resistors R1 and R2. However, the inverting output terminal Q of the mono-stable multivibrator MV1 is generally in the high state so that the transistor Q1 becomes an off-state and the power of the level signal detection device 200 is not supplied by the power supply, with the result that it has the effect upon saving the power consumption.

Figure 4:
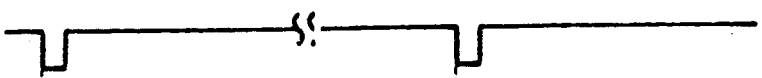
Figure 4:
Figure 4:
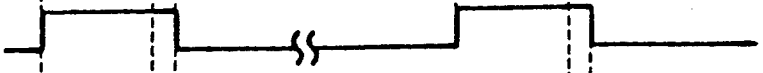
Figure 4:
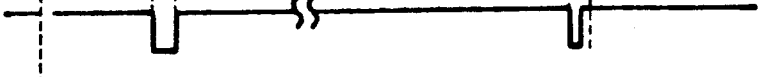
Figure 4:
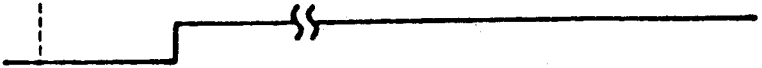

If the auto white selection switch SW having the output signal such as a waveform 4a in FIG. 4 is pressed so that the auto white set signal AWCSI falls generally from the high state to the low state, the inverting output Q of the multivibrator MV1 remains in a low state for a predetermined time such as 4b in FIG. 4 in accordance with a time constant decided by a capacitor C1 and a resistor R3. Therefore, the transistor Q1 becomes in an on-state so that the power of the level signal detection device 200 is supplied by the power source Vcc.

Also, the non-inverting output Q of the mono-stable multivibrator MV1 is inputted to the mono-stable multivibrator MV2 and the input of the MV2 is triggered at the lowering pulse, so that the iris is operated by the control output of the iris and the time elapse until the signal of the excessive intensity of radiation disappears when the auto white balance set is not progressed to be operated due to the excessive intensity of radiation. At the same time, the output of the mono-stable multivibrator MV2 is applied to the first terminal of the NAND gate G2 with a waveform 4C in FIG. 4, and the output of the comparator 30 is inverted and applied to the first input terminal of the NAND gate G2 by the inverter INV1. That is to say, when the output of the comparator 30 is in a low state, the auto white balance set switch SW is not operated even if it is pressed since the excessive intensity of radiation is above the predetermined level. Therefore, the iris is operated to be closed a little bit so that the excessive intensity of radiation is removed by the iris adjust signal generating device 500. And the capacitor C5 prevents the output of the comparator 30 from being inverted directly in the high state, holding the low state even if it is a short moment so that the output of the mono-stable multivibrator MV2 goes through the NAND gate G2 and the auto white balance set trigger signal is generated.

On the other hand, the level signal detection device 200 may be constructed with a different circuit so that only the signal above the set signal level is abstracted. And, the iris adjust signal generating device 500 draws out the output of the transistor Q5 from the collector of the transistor Q5 from the collector of the transistor Q5 so that the output signal is inverted to be controlled.

As described above, the present invention has the merit that the function of the auto white balance can be optimized normally so that the iris is controlled by detecting the excessive intensity of radiation above the predetermined level from the white colored subject.

What is claimed is:

1. An iris driving circuit, in a video camera having an auto white balance circuit selection switch, an iris control signal generating means and a white balance control means, comprising:
   power supply control means for supplying power;
   level signal detection means for detecting a signal of excessive intensity of radiation by extracting and amplifying only a luminance signal above a predetermined level representative of said excessive intensity of radiation signal from a received luminance signal;
   filter and amplifier means for filtering and amplifying the luminance signal representative of the excessive intensity of radition signal detected in the level signal detection means;
   a white balance set signal generating means for generating an auto white balance set signal in accordance with the filtered and amplified luminance signal representative of the excessive intensity of radiation from the filter and amplifier means; and
   an iris adjust signal generating means for generating an iris adjust signal by receiving the filtered and amplified luminance signal outputted from the filter and amplifier means.

2. An iris driving circuit as claimed in claim 1, wherein said power supply control means comprise:
   a second selection switch for selecting whether an automatic control, according to an auto white balance control signal input received from the auto white balance selection switch is performed or not;
   a mono-stable multivibrator for deciding a power supply time so as to set a non-stable state time with a time constant by a resistor and a capacitor connected to one terminal of the second selection switch;
   a PNP transistor for use as a power supply change-over switch having a pair of resistors; and
   another resistor and another capacitor for delaying off-time which are connected in series between an output terminal of the mono-stable multivibrator and ground.

3. An iris driving circuit as claimed in claim 1, wherein said level signal detection means comprises:
   a NPN transistor arrangement for use as a differential amplifier circuit;
   a resistor for limiting base current of a first transitor of said transistor arrangement;
   another resistor for use as a load of a collector of a second transistor of said transistor arrangement;
   a biasing resistor for biasing of the base of said second transistor;
   an emitter resistor connected to first and second transistors;
   a load resistor connected to the emitter of a third transistor; and
   a variable resistor for setting the predetermined level, whereby only the luminance signal above the predetermined level may be extracted and amplified.

4. An iris driving circuit as claimed in claim 1, wherein said filter and amplifier means comprises:
   an operational amplifier for use as a voltage follower;
   a non-inverting operational amplifier for amplifying a filtered signal;
   a feedback resistor of the non-inverting operational amplifier;

a resistor and a capacitor for filtering the luminance signal representative of said excessive intensity of radiation connected to the output terminal of the operational amplifier;

a variable resistor for setting the output level of the filtered signal;

a voltage bleeder resistor connected to one terminal of the variable resistor; and a capacitor for delaying output of said filtered signal having said set output level.

5. An iris driving circuit as claimed in claim 1, wherein said white balance set signal generating means comprises:

a mono-stable multivibrator for generating said auto white balance set signal, having a time constant determined by a resistor and a capacitor being connected to a non-inverting output terminal of a power supply control mono-stable multivibrator of said power supply control means;

a comparator for comparing the filtered and amplified luminance signal representative of the excessive intensity of radiation detected from said filter amplifier means a reference level set by means of reference level setting resistors;

a first NAND gate for combining logically an inverted auto white balance set signal input from a first inverter and the output signal of said comparator;

a second NAND gate for combining logically an inverted output signal of said comparator from a second inverter and the auto white balance set signal;

a first selection switch having one terminal connected to output terminals of said NAND gates and a second terminal connected to an auto white balance control signal input from said auto white balance selection switch.

6. An iris driving circuit as claimed in claim 1, wherein said iris adjust signal generating means comprises:

an emitter follower NPN transistor for outputting the iris adjust signal, having an input terminal connected to an output of said filter and amplifier means, having a variable resistor for setting the iris adjust signal and having an emitter resistor.

7. An apparatus for controlling an iris of a video camera, said apparatus comprising:

an iris driving circuit for receivng a luminance signal, for detecting a component of said luminance signal having an excessive intensity of radiation, for generating an auto white balance set signal in response to said detected component, and for generating an iris driving adjust signal in response to said detected component;

iris control signal generator means for receiving said luminance signal and for generating an iris control signal in response to said luminance signal;

means for mixing said iris driving adjust signal and said iris control signal to control the iris; and an auto white balance control circuit responsive to said auto white balance set signal generated by said iris driving circuit for performing auto white balance.

8. An apparatus for controlling an iris of a video camera, said apparatus comprising:

iris driving means for receiving a luminance signal, for generating an auto white balance set signal by detecting a component of said luminance signal having an excessive level of intensity of radiation, and for generating an iris driving adjust signal in response to said detected component;

iris control signal generator means for receiving said luminance signal and for generating an iris control signal in response to said luminance signal;

means for mixing said iris driving adjust signal and said iris control signal to control the iris; and balance control means for adjusting white balance in response to said auto white balance set signal.

9. The apparatus of claim 8, further comprised of means for providing electrical power to said iris driving means and said iris control signal generator means for a predetermined period of time.

* * * * *

UNITED STATES PATENT AND TRADEMARK OFFICE
CERTIFICATE OF CORRECTION

PATENT NO. : 5,132,805
DATED : July 21, 1992
INVENTOR(S) : Hae-yong Choi

It is certified that error appears in the above-indentified patent and that said Letters Patent is hereby corrected as shown below:

Column 5, line 49, after "intensity of", change "radition" to --radiation--;

Column 6, line 17, after "intensity of", change "radition" to --radiation--.

Signed and Sealed this

Twelfth Day of March, 1996

Attest:

BRUCE LEHMAN

Attesting Officer     Commissioner of Patents and Trademarks